April 15, 1930. H. T. KRAFT 1,755,065
TUBE STRIPPING MACHINE
Filed April 13, 1927 5 Sheets-Sheet 1
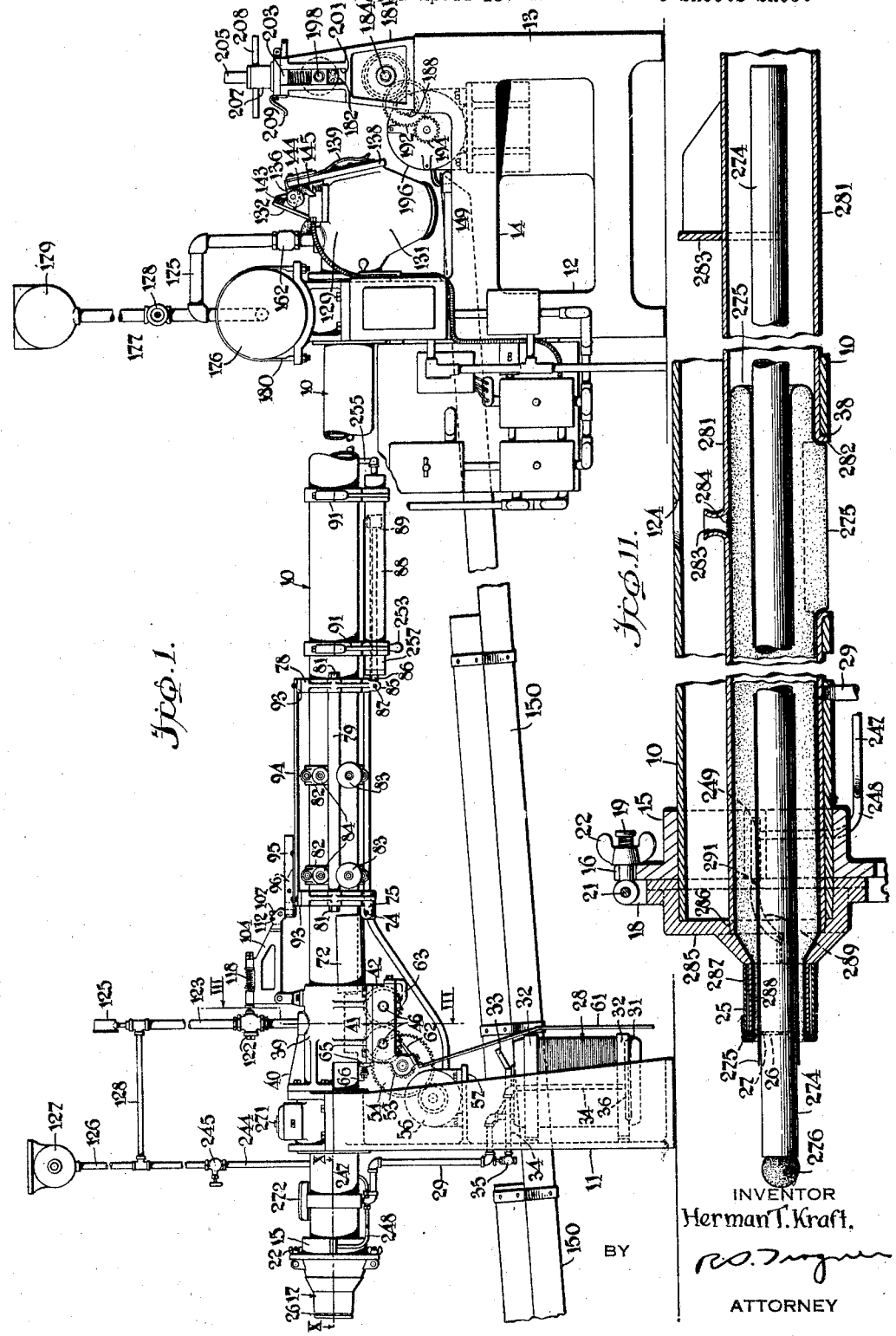
INVENTOR
Herman T. Kraft.
BY
ATTORNEY April 15, 1930.  H. T. KRAFT  1,755,065
TUBE STRIPPING MACHINE
Filed April 13, 1927   5 Sheets-Sheet 2
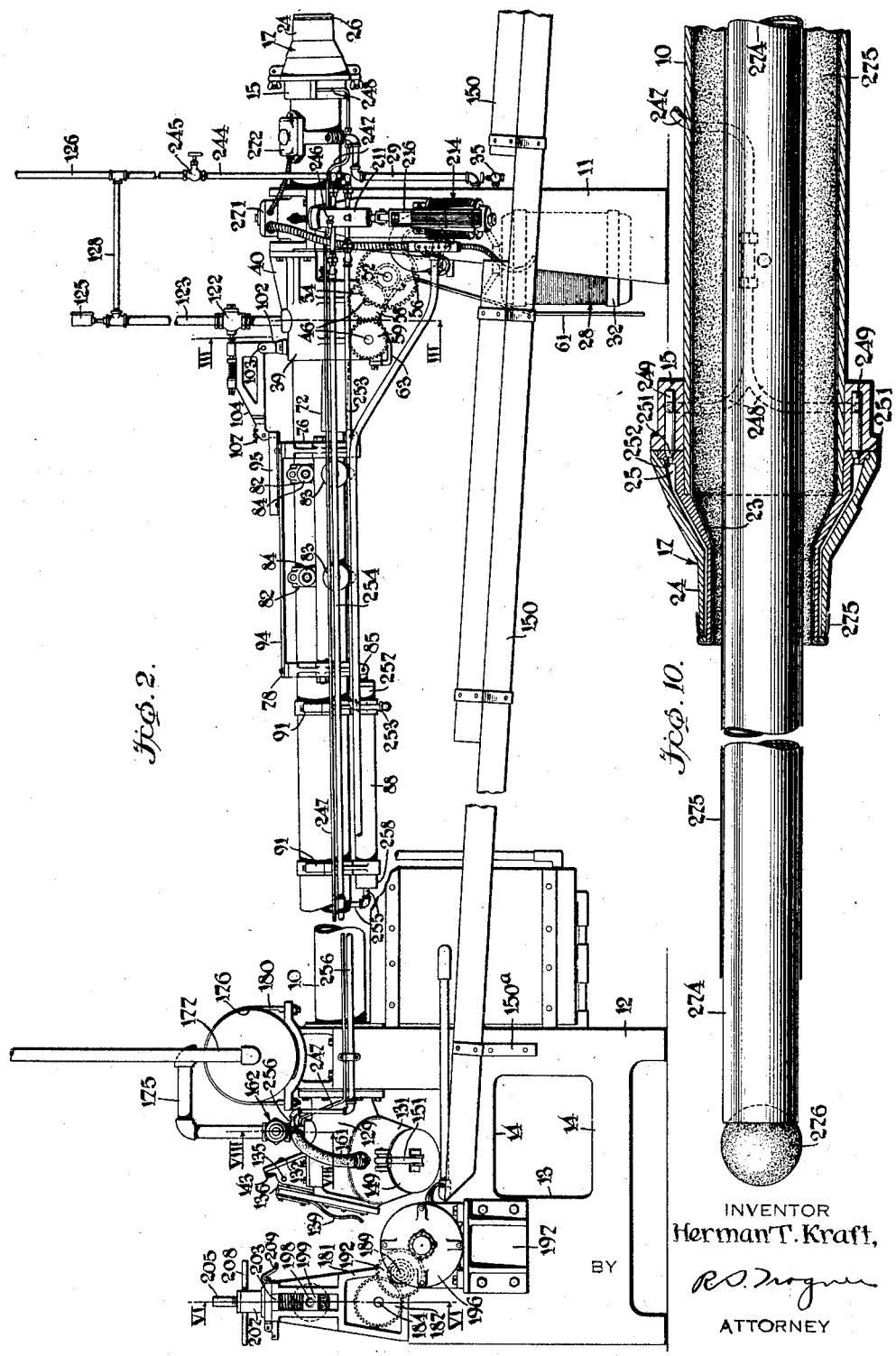
INVENTOR
Herman T. Kraft,
BY
ATTORNEY

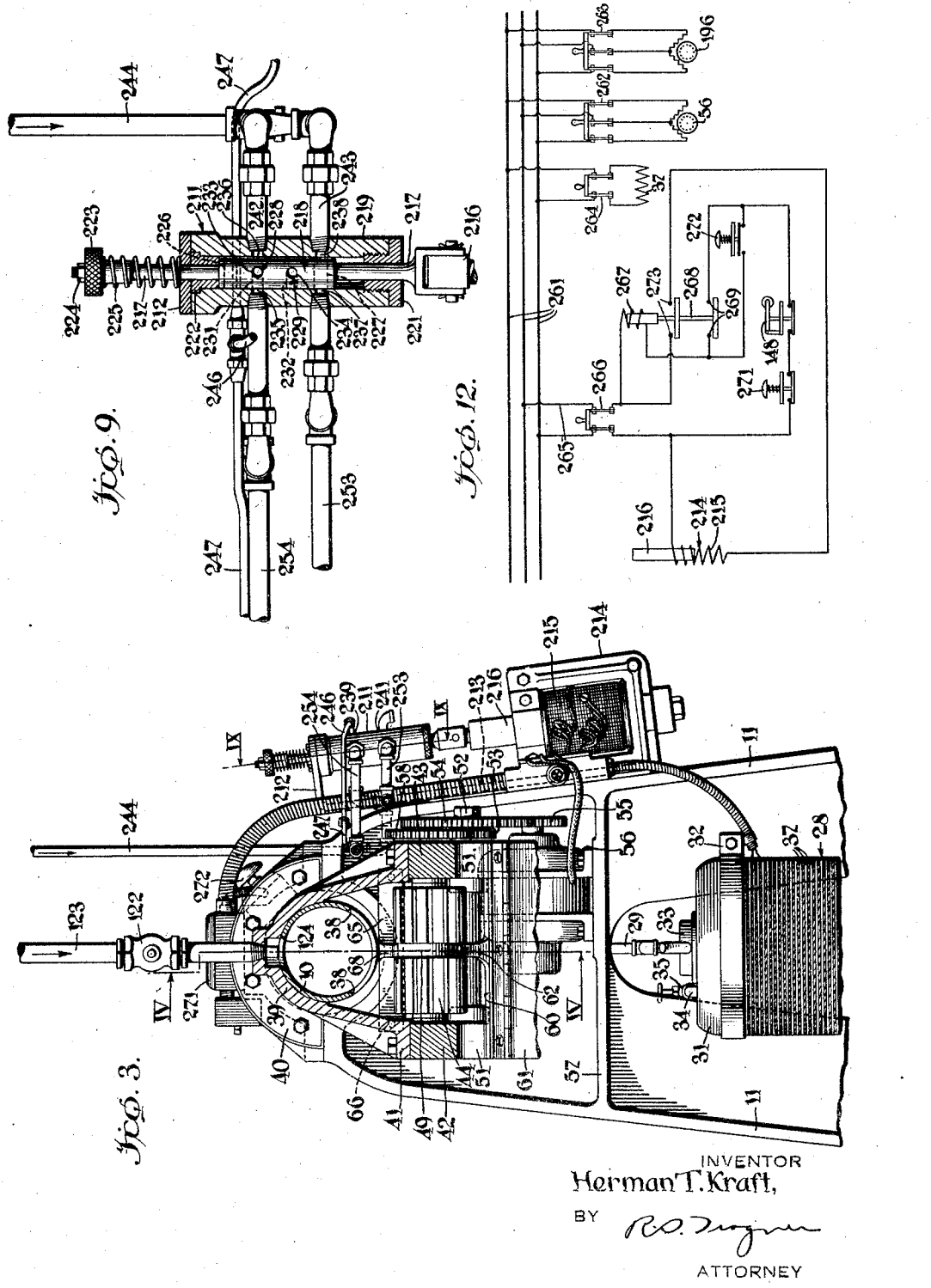

April 15, 1930.  H. T. KRAFT  1,755,065
TUBE STRIPPING MACHINE
Filed April 13, 1927   5 Sheets-Sheet 4
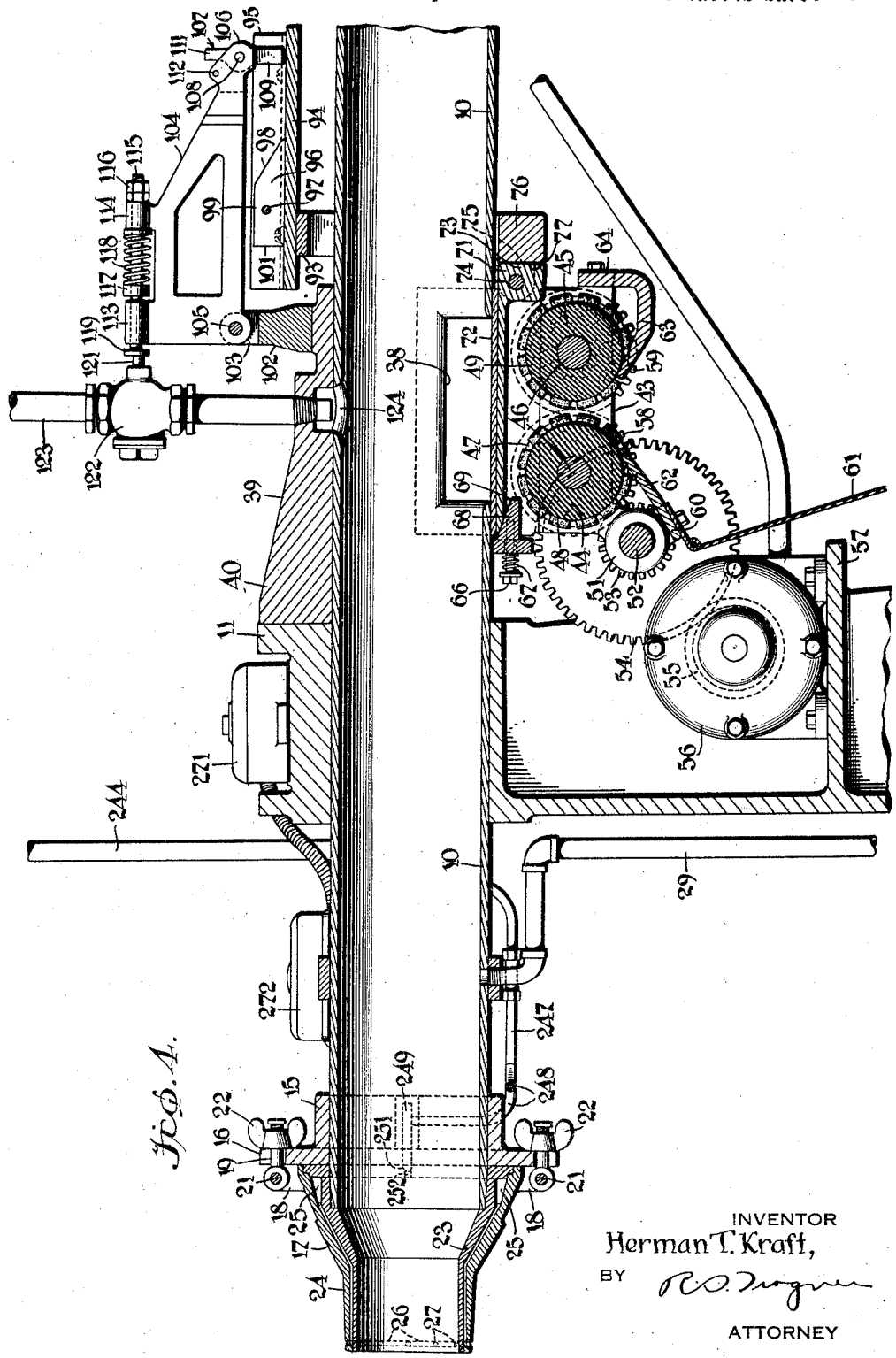
INVENTOR
Herman T. Kraft,
BY
ATTORNEY

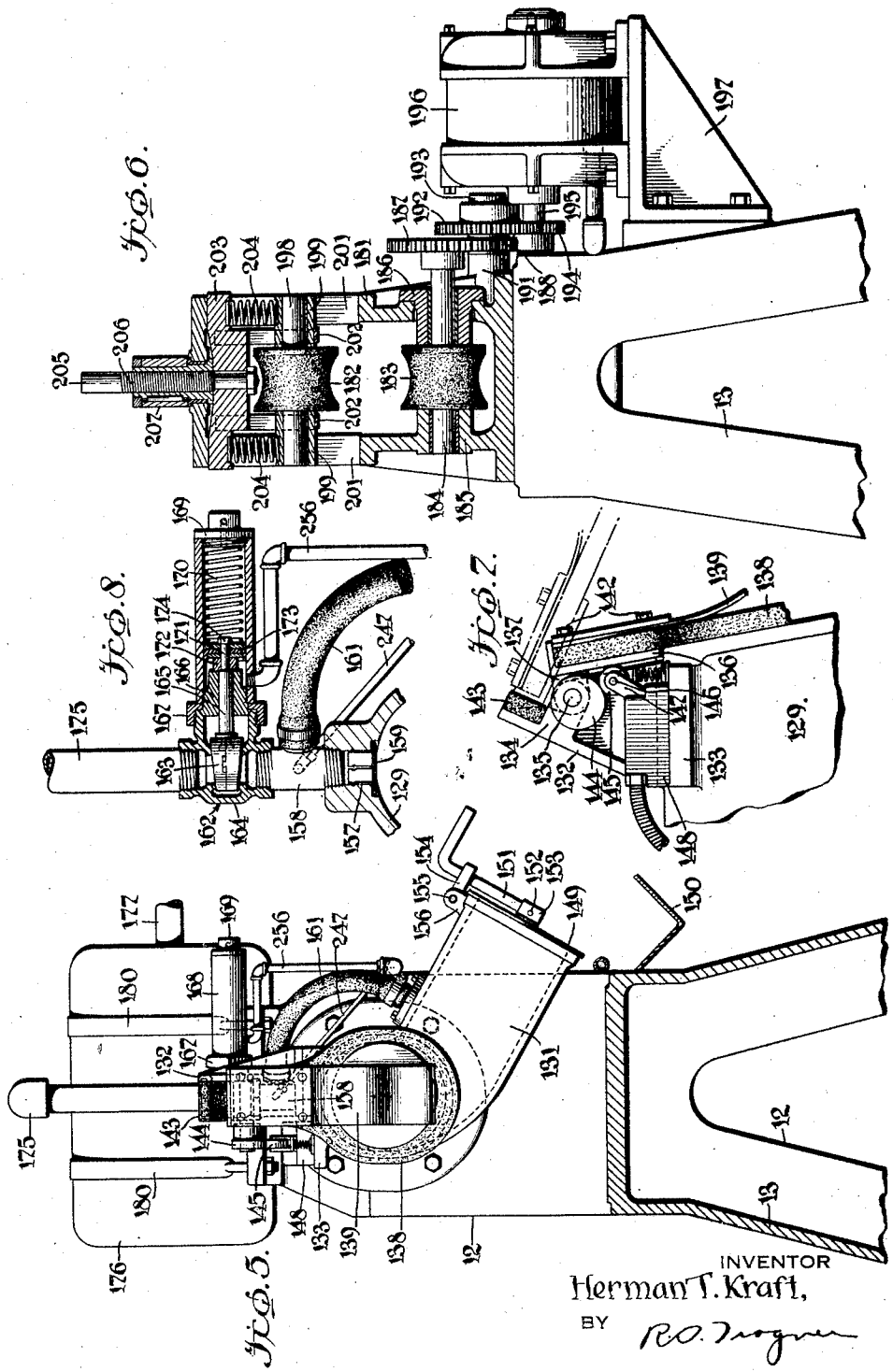

Patented Apr. 15, 1930

1,755,065

UNITED STATES PATENT OFFICE

HERMAN T. KRAFT, OF AKRON, OHIO, ASSIGNOR TO THE GOODYEAR TIRE & RUBBER COMPANY, OF AKRON, OHIO, A CORPORATION OF OHIO

TUBE-STRIPPING MACHINE

Application filed April 13, 1927. Serial No. 183,427.

My invention relates generally to machines employed in the process of manufacturing flexible articles and it has particular relation to apparatus of the above designated character which shall be especially applicable for the purpose of removing resilient articles from shaping or supporting members upon which such articles have been formed or mounted.

One object of my invention is to provide an apparatus which is adapted to receive a forming or shaping member having a flexible member disposed thereon and to separate expeditiously the two members during one cycle of operation of the apparatus without injury to either member and without requiring manual operations other than those of placing the members in operative position on the apparatus and starting the mechanism in its cycle of operations.

Another object of my invention is to provide a machine which will greatly reduce the cost of the operation of removing or stripping pneumatic tubes for automobile tires from forming mandrels as compared with the cost of so removing tubes by previously known methods.

Another object of my invention is to provide a machine which requires a relatively small amount of floor space, but that is capable of removing a relatively large number of tubes from mandrels within a given period of time.

A further object of my invention is to provide a machine that will generally obviate the uncertainty and delay that is customarily experienced in manually stripping rubber articles from forming mandrels, by devising a substantially automatically operating machine which efficiently separates the articles from the mandrels and conveniently deposits both the articles and the mandrels away from the machine.

In order to accomplish these and other numerous objects of my invention, I have constructed a machine that is both automatic and positive in its operation, and which is capable of removing tubes from mandrels at a high rate of speed.

Heretofore, the operation of removing tubes from mandrels has been manually performed. A mandrel, having a tube formed thereon, was secured in a horizontal position, by fastening one end of the mandrel in any convenient manner to a stationary frame. The end of the tube nearest the frame was cuffed or turned back for a short distance upon an adjacent portion of the tube and the nozzle of a hose conveying compressed air was inserted under the cuffed portion. As this portion of the tube became inflated by a blast of air from the hose, it was drawn manually toward the opposite end of the tube and thus stripped from the mandrel.

In order to acquire proficiency in stripping tubes by this method, the workman was required to have had a considerable amount of experience in the performance of the operation. However, there was always the danger of inadvertently inflating the tube at some point to such a degree as to cause injury thereto.

It will be apparent as the description proceeds that my invention represents a substantial advance in the art over the previously known methods of stripping tubular articles from mandrels.

My invention comprises a slightly inclined tubular vacuum chamber provided with a sleeve at one end which is adapted internally to receive the end of a tubular mandrel, and externally to support the end of a flexible tube carried by the mandrel. A ball, preferably composed of rubber, is so positioned by an attendant against and partially within the end of the mandrel as to obstruct the passage of air therethrough. The atmospheric pressure within the chamber is then reduced, thereby causing the pressure of the surrounding atmosphere to force the mandrel into the chamber. The reduction in pressure within the chamber also causes the tube, as it is drawn from the mandrel, to expand outwardly against the inner surface of the chamber thereby preventing interference of the concentric portions of the tube which move relatively at a rapid rate.

When the tube has thus been stripped from the mandrel, the pressure reducing means is automatically rendered inoperative by the action of the mandrel striking a closure member at the opposite end of the chamber, and the tube thereafter is blown automatically from the apparatus through an opening which is provided in the side of the chamber. I also employ continuously operating bite rollers to aid in extracting the tube from the chamber so that the operation shall be more easily and positively performed. As soon as the vacuum is broken in the chamber, the ball, being automatically released from the end of the mandrel, rolls down the inclined inner surface of the chamber and falls into an oppositely inclined trough which returns the ball to the station of the attendant.

For a better understanding of my invention, reference may now be had to the accompanying drawings, forming a part of this specification, in which:

Fig. 1 is a side elevational view of an apparatus illustrating one form which my invention may assume, a portion of the structure being broken away so as to provide a view of the essential operating mechanisms;

Fig. 2 is another elevational view taken from the side opposite to that illustrated by Fig. 1;

Fig. 3 is a cross-sectional view, on a larger scale, taken substantially along the lines III—III of Figs. 1 and 2;

Fig. 4 is a vertical longitudinal sectional view of a portion of the apparatus taken to the right hand side of line IV—IV of Fig. 3;

Fig. 5 is an elevational view of one end of the apparatus;

Fig. 6 is a view partially in elevation and partially in cross-section showing a portion of the apparatus at the left hand side of line VI—VI of Fig. 2;

Fig. 7 is an elevational view on a larger scale of the closure mechanism at one end of the apparatus;

Fig. 8 is a view partially in cross-section and partially in elevation taken substantially along the line VIII—VIII of Fig. 2;

Fig. 9 is a cross-sectional view of a valve member for controlling the operation of the apparatus, the view being taken substantially along the line IX—IX of Fig. 3;

Fig. 10 is a horizontal longitudinal sectional view, taken substantially on line X—X of Fig. 1, of a portion of the apparatus adjacent one end thereof, illustrating the operative relationship of a tube and a mandrel therewith;

Fig. 11 is a vertical longitudinal sectional view adjacent one end of the apparatus showing the application of an attachment therefor; and, Fig. 12 is a diagrammatical illustration of the circuits of the various electrical units which control the operation of the apparatus.

In practicing my invention I employ a hollow elongate member 10 which is supported at its opposite ends by frame members 11 and 12. The height of the frame member 11 is substantially greater than the height of the frame member 12 in order to provide a slight inclination in the mounted position of the tubular member 10. The frame 12 includes a vertical pedestal-like portion 13 and integral horizontal reinforcing members 14.

A flanged collar 15 (Fig. 4) is rigidly mounted adjacent one end of the tubular member 10, the flange of the collar having oppositely disposed pairs of spaced lugs 16 extending radially from the periphery thereof. A sleeve 17 is adapted to engage slidably the end of tubular member 10 and to abut the flanged portion of the collar 15. The sleeve has oppositely disposed vertically extending pairs of spaced lugs 18 which pivotally support bolts 19 upon pins 21 extending therebetween. The bolts 19 are adapted to be positioned between the lugs 16, and wing nuts 22 operatively engage the bolts 19, in order to fasten the collars 17 removably upon the end of the tubular member 10. The sleeve 17 comprises spaced and flanged concentric sections 23 and 24 having a closed annular chamber 25 therebetween. The end of the sleeve 17 remote from the collar 15 is reduced in its diameter and a groove 26 is formed circumferentially of this portion of the sleeve adjacent its extreme edge. Spaced openings 27 provide communication between the groove 26 and the annular chamber 25.

A soapstone dispersing device 28 (Fig. 1) is connected, by a pipe 29, to the tubular member 10 at a point adjacent the flanged collar 15. A container 31, which forms a part of the soapstone dispersing device 28 is secured to the frame member 11 by means of straps 32. A cap 33 is adapted to be threaded upon an opening in the top of the container 31 and provides a fluid tight closure therefor. This cap may be removed for the purpose of filling the container with soapstone or other powdered material when desired. A pipe 34, having a conventional globe valve 35 at one end thereof, extends through the top of the container 31 and communicates with a perforated annular ring 36 arranged adjacent the bottom of the container.

In order to prevent the soapstone within the container 31 from solidifying, due to its absorption of moisture from the atmosphere, I have provided a heating element 37, which is adapted to maintain the container at a moderate temperature. This heating element comprises an insulated coil of resistance wire so wound upon a large portion of the surface of the container that it will be heated uniformly.

A rectangular opening 38 (Figs. 3 and 4) is formed in the lower side of the tubular member 10 and an inverted U-shape saddle 39 is positioned directly opposite the opening on the upper side of the tubular member. This saddle has an offset portion 40 which is bolted to a portion of the frame member 11 through which the tubular member 10 extends. The saddle 39 has horizontally disposed flanges 41 formed on the lower extremities thereof to which bearing blocks 42 and 43 are bolted. Rubber bite rollers 44 and 45 are rotatably supported on shafts 46 which are journalled at their opposite ends in the bearing blocks 42 and 43. The rollers 44 and 45 are provided with a plurality of longitudinally formed grooves 47 and circumferentially formed grooves 48 and 49 respectively midway between the ends thereof.

Bearing lugs 51 extending from corresponding ends of the bearing blocks 42 and 43 rotatably support a short shaft 52. A pair of reduction gears 53 and 54 are rigidly mounted adjacent the end of the shaft 52 beyond the lug 51 that extends from bearing block 43. The larger gear 54 is adapted to mesh with a drive pinion 55 that is rigidly mounted on the shaft of a motor 56. A shelf 57 formed integrally with the frame member 11 rigidly supports the motor 56. The smaller gear 53 is adapted to mesh with one of a pair of intermeshing gears 58 and 59 that are rigidly mounted on the ends of the shafts 46 that extend beyond the bearing block 44.

An elongate bar 60 and the supporting strap of a hinged apron 61 are adapted to be bolted adjacent the ends of the bar to the bearing lugs 51. A pointed finger-like portion 62 extends from the middle portion of the bar 60 transversely thereof. The end of this finger is adapted to extend tangentially into the circumferential groove 48 of the bite roller 44. A finger 63 is similarly disposed in the groove 49 of the bite roller 45 and is supported by an elongate bar 64 that is bolted to the bearing blocks 42 and 43 at the ends thereof opposite the lugs 51. The finger 63 may be curved or bent in any suitable manner in order to assume its proper position with respect to the groove 49.

An elongate strap 65 is slidably mounted on stud bolts 66 that are threaded into openings in the ends of the bearing blocks 42 and 43, the openings being formed in the ends of blocks adjacent the lugs 51 and so disposed with respect to the tubular member 10 that the strap 65 is substantially tangent to the member. Springs 67 are interposed upon the bolts 66 between the heads thereof, and the strap 65. It is apparent that the springs 67 will maintain the strap 65 in a position abutting the ends of the bearing blocks 42 and 43, but that they may be so compressed as to permit the strap to recede from the blocks. The strap 65 is provided with a lug 68 which projects from a point midway between its ends, and has an inclined upper surface 69 which is complementary to an inclined surface at the end of an elongate hinge member 71. The member 71 has an arcuate closure member 72 rigidly secured thereto, which is adapted at intervals to occupy a position directly in front of the opening 38 in the tubular member 10.

The closure member 72, being substantially larger than the opening 38, is adapted to seat adjacent its edges against the surface of the tubular member 10 and the engaging surfaces may be so finished as to provide a relatively fluid tight fit between the members. The member 71 has an enlarged portion 73 at its opposite end which is pivotally supported upon a pin 74 secured between spaced lugs 75 extending normally from the lower portion of a U-shape bracket 76. The abutting surfaces of the enlarged portion 73 and the bracket 76 are spaced slightly adjacent their lower edges, as indicated at 77, so as to permit a slight declination toward the beveled end of the member 71 when it is not engaging the lug 68. This inclination of the member 71 permits the closure member 72 to recede from engagement with the tubular member 10 so as to minimize the amount of wear upon the engaging portions.

A second U-shape bracket 78 (Figs. 1 and 2) is spaced a substantial distance from the bracket member 76, the two members being interconnected by means of a pair of oppositely disposed rails 79. These rails are provided with reduced portions at their ends upon which nuts 81 are threaded that maintain the brackets 76 and 78 against the shoulders adjacent the reduced portions. Spaced clamping rings 82 are mounted rigidly on the tubular member 10, each of the rings rotatably supporting spaced rollers 83 and 84 disposed in pairs on opposite sides of the rings. The roller 83 have concave circumferential surfaces and are adapted to engage the lower surfaces of the rods 79. The rollers 82 have flat surfaces and so engage the upper surface of the rods 79 as to maintain the rods in engagement with the rollers 83.

A pair of lugs 85 extending normally from the lower portion of the bracket 78, pivotally support a rod 86, as indicated at 87. The rod 86 slidably engages an opening in the end of a cylinder 88 and has a piston 89 rigidly secured at its end within the cylinder. The cylinder 88 is supported adjacent the lower side of the tubular member 10 by means of clamping brackets 91. It is apparent that movement of the piston 89 results in a corresponding movement of the closure member 72 into or away from the opening 38, depending on the position of the piston within the cylinder.

Straps 93 are bolted across the upper ends of the bracket members 76 and 78 and an elongate bar 94 is rigidly secured at its ends to the straps 93 intermediate the ends thereof.

A pair of spaced guide brackets 95 are mounted horizontally upon the bar 94 adjacent one end thereof. A cam 96 is rigidly mounted upon a pin 97 between the brackets 95 and is provided with an inclined surface 98, a horizontal surface 99 and a vertical surface 101 (Fig. 4).

A bracket 102, having vertically extending spaced lugs 103, is rigidly mounted upon the saddle 39 adjacent the edge thereof opposite the extending portion 41 and a member 104 is pivotally mounted between the lugs 103 upon a pin 105. A portion of the member 104 remote from the pin 105 is provided with spaced lugs 106 that are adapted slidably to engage the guides 95 and between which a follower 107 is pivotally supported upon a pin 108 intermediate its ends. A portion 109 of the follower 107 is heavier than the oppositely disposed portion 111 and consequently, it normally remains suspended in the lowest possible position.

A pin 112 traversing the lugs 106 is so spaced from the normal position of the portion 111 of the follower 107 as to limit the rotation of the follower in one direction. A pair of bearing lugs 113 and 114 extend beyond the upper edge of the member 104 and are provided with aligned openings which slidably receive a pin 115. One end of the pin 115 is provided with threads to receive a pair of lock nuts 116 externally of the lug 114. A collar 117 is rigidly mounted upon the pin 115 adjacent the lug 113 and a spring 118 surrounding the pin 115 is adapted to be confined between the collar and the lug 114. The end of the pin beyond the lug 113 is provided with an enlarged portion 119 which is adapted to engage the end of a stem 121 of a globe valve 122. The globe valve 122 is interposed in a pipe 123 which is threaded at one end into an opening in the saddle 39 directly opposite the central portion of the opening 38. An opening 124 is formed in the tubular member 10 in order to provide a communication between the interior of the member and the pipe 123. The opposite end of the pipe 123 communicates with a pressure gauge 125 and is connected to a pipe 126 leading from a compressor 127 by a pipe 128.

The end of the tubular member 10, (Fig. 7) opposite the sleeve 17, is connected to a chambered member 129 having a depending portion 131 extending therefrom. A bracket 132 is rigidly secured to the member 129 upon a horizontal platform 133 formed on the upper surface thereof. The bracket 132 is provided with spaced lugs 134 extending normally therefrom which rotatably support a pin 135. A bracket 136 has a lug 137 projecting therefrom, which is rigidly mounted on the pin 135 between the lugs 134. This bracket is adapted to receive a door or closure member 138, preferably composed of flexible material, such as rubber, and having a leaf spring 139 superimposed thereupon. The closure member 138 and the spring 139 are secured to the bracket 136 by means of suitable bolts 142. The closure member 138 is adapted to abut the end portion of the member 129 and obstruct an opening therein which forms a continuation of the opening in the tubular member 10. A portion of the bracket 132 extends beyond the lugs 134 and has a rubber stop 143 rigidly mounted thereon.

It is apparent that in the normal position the closure member 138 will be maintained against the opening in the end of the member 129 by the force of gravity, and when displaced therefrom by an independent force will abut against the stop 143.

The pin 135 extends beyond one of the lugs 134 and a cam 144 is rigidly mounted thereon. The surface of the cam 144 is adapted to engage a roller 145 rotatably mounted upon a pin 146 rigidly mounted in the bifurcated end of a lever 147. The lever 147 extends into the casing of a conventional elevator door switch 148 that is mounted on the platform 133 beside the bracket 132.

The cam 144 is so mounted upon its pin 135 that the lever 147 will be depressed when the closure member 138 is moved towards the stop 143. When the lever 147 is so actuated the circuit through the switch 148 is opened.

The depending portion 131 (Fig. 5) is provided with an opening which is normally closed by means of a disc 149 which is pivotally mounted upon the end of a rod 151. A pin 152, extending through the end portion of the rod 151, engages a pair of spaced lugs 153 that project normally from the central portion of the disc. The rod 151 is rigidly secured in an opening through the end of a block 154 which is pivotally mounted at its one end upon a pin 155 traversing a pair of spaced lugs 156 that extend normally from the depending portion 131. Beyond the block 154, the end of the rod 151 is bent at right angles in order to render more effective the weight of the rod in maintaining the disc 149 firmly against the opening in the portion 131. One end of a trough 150, supported by means of a bracket 150ª upon the frame 12, is positioned immediately below the opening in the depending portion 131, the trough being inclined downwardly toward its opposite end which is located a substantial distance beyond the end of the tubular member 10.

An opening 157 (Fig. 8) formed in the upper portion of the member 129 adjacent the bracket 132, is provided with a pipe nipple 158 threaded therein. A screen 159 is mounted in the opening 157 in order to prevent possible entrance of foreign matter into the nipple 158. A section of hose 161 connects the nipple 158 to the depending portion 131, and a screen (not shown), similar to the screen 159, is positioned adjacent the connection of the hose and the depending portion 131. The conduit provided by the hose 161 is merely for the purpose of insuring an open passage between the nipple 158 and the member 129. The nipple 158 is threaded at its opposite end into one of the openings of a pneumatic gate valve 162. The gate valve 162 is provided with a gate portion 163 which is adapted to seat upon suitably constructed portions of a casing 164, and rod 165 secured to the gate portion 163 controls the operation thereof. The rod 165 is slidably mounted in an opening in a plug 166 which has shoulders that engage a flanged collar 167, that is threaded upon the casing 164.

The plug 166 is threaded beyond the flanged collar 167 to receive the end of a cylinder 168, the opposite end of which is closed, except for a suitable vent opening, by a plug 169 threaded therein. The end of the rod 165 opposite the gate 163 has a reduced portion 171, which is adapted to receive a collar 172 and a piston assembly 173, slidably disposed within the cylinder 168, is secured by a nut 174 upon the reduced portion 171 of rod 165 abutting the collar 162. A spring 170 positioned between the piston assembly 173 and the plug 169 is adapted to maintain the valve normally closed.

A pipe 175, connected to the upper portion of the valve 162, is also connected to a steel capacity tank 176, one of the ends of the tank 176 being connected by a pipe 177, having a valve 178 interposed therein, to a vacuum pump 179. The tank 176 is rigidly secured on the upper portion of the frame 12, above the tubular member 10 by means of straps 180.

A frame 181, mounted upon the pedestal 13, rotatably supports a pair of spaced concave rubber bite rollers 182 and 183, the opening between the rollers being directly in alignment with the opening in the tubular member 10. The roller 183 is rigidly mounted upon a shaft 184, one end of which is rotatably journalled in a bearing 185 formed integrally with the frame 181. The opposite end of the shaft 184 is rotatably mounted in a flanged sleeve 186 which extends through an opening in the frame 181, the flange of the sleeve abutting a portion of the frame adjacent the opening. The shaft 184 extends beyond the sleeve 186 and has a gear wheel 187 rigidly mounted thereon. A second gear 188 rotatably mounted on a pin 189 and intermeshing with the gear 187 extends beyond a lug portion 191 formed integrally with the frame 181.

The gear 188 is rigidly secured to a larger gear 192, the two gears being adapted to rotate as a unit upon the pin 189. The pin 189 is provided with an enlarged head portion 193 at its outer end which is adapted to maintain the pair of gears 188 and 191 upon the pin and in abutting relation to the lug 191. The gear 192 is rotatably driven by a gear 194 which is rigidly mounted on the drive shaft 195 of a motor 196. A shelf 197 is adapted to be bolted to a portion of the pedestal 13 and rigidly supports the motor 196.

The bite roller 182 is mounted upon a shaft 198, the ends of which are rotatably journalled in sleeves 199. The sleeves 199 have square portions formed adjacent the outer ends thereof which are adapted to slide vertically within guide openings 201 formed in the frame 181. Stirrups 202 externally engage the sleeves 199 adjacent the roller 182, the ends of the stirrups being rigidly secured to a yoke 203. The ends of the yoke 203 are also arranged slidably within the guide openings 201. Springs 204 confined between the opposite ends of the yoke 203 and the upper squared portions of the sleeves 199 tend to maintain the roller 182 in its lowermost position against the stirrups 202.

A vertically disposed rod 205 is rigidly mounted upon an intermediate portion of the yoke 203 and has a threaded portion 206 which operatively engages a head 207 rotatably journalled in an opening in the upper portion of the frame 181. The head 207 is provided with oppositely disposed handles 208 (Fig. 1) with which the head may be manually rotated in either direction so as to raise or lower the yoke 203, and consequently, adjust the position of the roller 182 with respect to the roller 183.

A curved spring plate 209 is adapted to be bolted to one edge of an upper portion of the frame 181 and engages the leaf spring 139 so as to minimize the distortion of the rubber closure member 138 when it is violently opened against the stop 143.

A two-way valve 211 (Fig. 9) which is adapted to control the operation of the mechanical units hereinbefore described, is bolted at its upper end to a transversely extending portion 212 of a strap 213. The strap 213 is rigidly mounted in a vertical position on one side of the frame member 11, and also rigidly supports a solenoid 214 at its lower end. The solenoid 214 is provided with a coil 215 and a core 216, the core having pivotal connection to a rod 217, which has a piston 218 formed integrally therewith intermediate its ends. A casing 219 is adapted to receive a plug 221 which closes the lower end of the casing and slidably engages the rod 217 below the piston 218. A plug 222 is positioned in a recessed portion formed in the upper end of the valve casing 219 and is secured therein by the portion 212 of the bracket 213 which supports the valve.

The piston 218 is adapted to engage the plugs 221 and 222 and is limited thereby in its reciprocative movement. The rod 217 extends beyond the piston 218 through an opening in the plug 222 and has a flanged collar 223 secured by a nut 224 upon its extreme end. A spring 225 is adapted to be confined between the flanged portion of the collar 223 and the portion 212 of the bracket 213. It is apparent that normally the spring 225 will maintain the piston 218 against the plug 222.

The piston has a pair of ducts 226 and 227 extending transversely therethrough adjacent its ends and a second pair of ducts 228 and 229, formed in the piston 218, are spaced equal distances from the openings 226 and 227 respectively. The duct 228 includes a portion 231 parallel to the ducts 226 and 227 and a second portion 233 disposed at right angles thereto. Likewise, the duct 229 includes a portion 232 parallel to the ducts 226 and 227, and a portion 234 disposed at right angles thereto. Oppositely disposed pairs of ports 235—236 and 237—238 are formed in the casing 219 in the plane of the ducts 226 and 227, and are spaced by a distance equal to the distance between the duct 226 and the duct 229. This distance is likewise equal to the distance between the duct 228 and the duct 227. The casing 219 is also provided with ports 239 and 241 formed in the horizontal plane of and perpendicular to the pairs of ports 235—236 and 237—238 respectively. In the normal position of the valve 211, the ports 235 and 239 communicate with each other through the ducts 228, and the ports 237 and 238 commmunicate with each other through the ducts 227.

Pipes 242 and 243 communicating respectively with ports 236 and 238 are connected by a pipe 244 having a valve 245 interposed therein to the pipe 126 that communicates with the air compressor 127. A section of pipe 246 connects the port 239 to an intermediate portion of a pipe 247. One end of the pipe 247 communicates with the nipple 158 (Fig. 8), the opposite end of the pipe being bifurcated, as indicated at 248 (Fig. 10). The sections 248 of the pipe 247 communicate with hollow plugs 249 having tapered ends 251 and are disposed longitudinally of the tubular member 10 within the flanged collar 15. The tapered portions 251 of the plugs 249 extend beyond the edge of the collar 15 and are adapted to seat in complementary tapered openings 252 that communicate with the annular chamber 25.

The port 237 (Figs. 2 and 9) of the valve 211 communicates through a pipe 253 with one end 257 of the cylinder 88 which is nearest the opening 38 in the tubular member 10. The port 235 communicates with the opposite end 258 of the cylinder 88 through a pipe 254 and a pipe 255. The port 235 also communicates through the pipe 254 and a pipe 256 with the cylinder 168 (Fig. 8) on the side of the piston 171 opposite the spring 170.

It is apparent that the valve 211, (Fig. 9) when in the normal position hereinbefore referred to, provides a communication between the supply of air under pressure in the compressor 127 to the end 257 of the cylinder 88 and the cylinder 168. Since the pipe 153 communicates with the end 257 of the cylinder 88, the piston 89 within the cylinder will normally be urged in such direction as to maintain the arcuate closure member 72 in a position remote from the opening 38. While the elements mentioned are in this position, the opposite end 258, having the pipe 255 connected thereto, communicates with the annular chamber 25 in the sleeve 17 through the duct 228 of the valve 211. When, however, the solenoid 215 is energized, the piston 218 moves into a position abutting the plug 221 and the pipe 254 which communicates with the cylinder 168 and the end 258 of the cylinder 88 is supplied with air under pressure through the duct 226 and the pipe 242 from the compressor 127. Thus the piston 89 will be urged in a direction away from the end 258 of the cylinder 88 so as to move the closure member 72 into a position in which the opening 38 is closed and as the end of the hinge 69 engages the inclined surface of the plug 68, the closure member is firmly seated against the tubular member 10. Simultaneously therewith, the air in the end 257 of the piston 88 is exhausted through the pipe 253, the duct 229 and into the atmosphere through port 241. Also simultaneously with the operations just described, the air under pressure through pipe 256 moves the piston 173 against the tension of the spring 170 thus moving the gate 163 out of its seated position within the valve casing 164. The communication between the vacuum pump 179 and the tubular member 10 being thus unobstructed, the air is immediately exhausted from the latter. The pipe 247, being in communication with the nipple 158, also exhausts the air from the annular chamber 25 in the sleeve 17.

A three phase power line 261 supplies the energy for actuating the several electrical devices associated with the apparatus. The motors 56 and 196 are connected to the power line 261 and are operatively controlled through appropriate starting devices 262 and 263. The coil 37, which is employed in heating the soapstone container 31, is connected across one phase of the power line 261 and controlled through a switch 264.

A secondary power line 265, also connected across a single phase of the power line 261 is controlled by an appropriate switch 266 and supplies a current for energizing the various circuits of the control system of the apparatus. The coil 267 of a double pole relay switch 268 is connected across the secondary power line 265 in series with a pair of terminals 269 of the relay switch 268, the elevator door switch 148 and a normally closed push button switch 271. A normally open push button switch 272 is connected in a shunt circuit across the terminals 269 of relay switch 268. The remaining pair of terminals 273 of the relay switch 268 are connected in series with the coil 215 of the solenoid 214 in a second circuit across the power line 265.

Assuming the switch 266 to be in its closed position, it is apparent that the temporary closing of the normally open push button switch 272 will cause a current to traverse the coil 267 of the relay switch 268 thereby closing the circuits through terminals 269 and 273 of the switch and the current will continue to traverse the coil 267 thereafter, even when the switch 272 assumes its normally open position. The coil 215 of the solenoid 214 is simultaneously energized and the core 216 tends to assume a central position within the coil. If the circuit is opened through either of the switches 148 or 271, the solenoid 214 and the relay switch 268 will assume the normal position as illustrated.

In the operation of my apparatus, the motors 56 and 196 and the heating coil 37 are adapted to be continuously energized during the entire period of operation of the apparatus.

An attendant places a mandrel 274, having an elastic inner tube 275 superimposed thereupon, on a horizontal supporting platform (not shown) located in alignment with the tubular member 10 adjacent the end thereof upon which the sleeve 17 is mounted. The platform may be provided with a plurality of rollers or other suitable conveying means so that the mandrel may be conveniently transported longitudinally of the platform.

One end of the mandrel is inserted within the sleeve 17 and the corresponding end of the tube is then so cuffed upon the sleeve 17 as to extend beyond the groove 26. A rubber ball 276 is then placed against the other end of the mandrel in order to close the opening therein. Immediately after this operation, the circuit is closed through switch 272 and a current traverses the coil 215, as hereinbefore described. Consequently, the core 216 moves the piston 218 of the valve 211 away from its normal position and against the plug 221. When the piston 218 is in this position, communication is established between the compressor 127 through the valve 211 to the cylinder 168, thereby opening the valve 162 and establishing communication from the interior of the tubular member 10 to the vacuum pump 179.

The air is thereafter immediately exhausted from the tubular member 10 and from the annular chamber 25. As the closure member 72 is moved into a position adjacent the opening 38, the air in the end 257 of the cylinder 88 is exhausted into the atmosphere through the opening 229 and the port 241. Simultaneously with this movement of the closure member 72, the lower end of the follower 107 engages the surface 101 of the cam 96 and is rotated into a relatively horizontal position in which it remains while traversing the horizontal surface 99, after which it assumes its original vertical position between the guide brackets 95 while traversing the inclined surface 98.

By reason of the vacuum in chamber 25, it is apparent that the pressure of the surrounding atmosphere will maintain the end of the tube 275 that is cuffed on the sleeve 17 firmly impressed into the recess 26. Simultaneously the pressure also exerts a force against the ball 276 and an annular portion of the tube 275 between the sleeve 17 and the mandrel 274. It is apparent that as a result of this force the mandrel will move longitudinally of itself into the tubular member 10 while the end portion of the tube 275 cuffed upon the sleeve 17, remains in a stationary position. The tube is thus progressively invaginated from the mandrel as it moves into the tubular member 10 and the tube is expanded by reason of the pressure of the atmosphere between its relatively moving portions into a position against the surface of the tubular member 10. The motion of the mandrel 274 is continuously accelerated during its movement into the tubular member 10 and when substantially all portions of the tube 275 have been expanded in the manner described, the mandrel violently strikes the closure member 138 at the opposite end of the tubular member 10.

The closure member 138 is thus rotated into the position indicated by dot and dash lines in Fig. 7, and the mandrel 274 continues its travel into a position between the bite rollers 182 and 183. These rollers complete the removal of the mandrel 274 from the apparatus, after which it may be carried away by any suitable conveying mechanism, or placed manually upon an adjacent truck by an attendant.

Simultaneously with the movement of the closure member 138, the cam 144, which is rigidly mounted on the pin 135, is rotated so as to depress the arm 147 and thereby open the circuit through the switch 148. The coil 267 of relay switch 268 and the coil 215 of solenoid 214 being thus de-energized, the piston 218 of the valve 211 assumes its normal position against the plug 222 as hereinbefore described.

In this position of the valve 211, the application of air under pressure within the cylinder 168 is discontinued as a result of which the valve 162 prevents further communication between the vacuum pump 179 and the chamber 10. Accordingly, the vacuum within the chamber 10 is broken. Simultaneously therewith, air under pressure is supplied to the end 257 of the cylinder 88 which results in the movement of the closure member 72 into its normally open position. As the piston 89 is thus moved toward the opposite end 258 of the cylinder 88, the air in front of the piston is driven from the cylinder through the valve 211 and the pipe 246, into the pipe 247 from which a portion of it flows into the annular chamber 25. The tube is thereby blown from its cuffed position upon the sleeve 17, and momentarily lies extended within the tubular member 10 across the opening 38.

As the closure member 72 moves into its normally open position, the end 109 of the follower 107 traverses the surface 98 of the cam 96, but is prevented from assuming a horizontal position by engagement of its ends 111 with the pin 112. The follower is thus maintained in such an inclined position that further traversing of the inclined surface 98 causes the member 104 to be pivoted upon its supporting pin 105. This movement of the member 104 causes the end 119 of the pin 115 to strike the valve actuating member 121 thereby opening the globe valve 122 and permitting air under pressure from the compressor 127 to be admitted in the form of a blast through the openings 124 and 38, and thus transversely through the tubular member 10. The spring 118 provides a cushioning action of the pin 115 as it strikes the valve actuating member 121. The blast of air through the opening 124 blows the tube 275 through the opening 38 into engagement with the rotating bite rollers 44 and 45. These rollers immediately withdraw the entire tube 274 from the tubular member 10 and deposit it upon a suitable conveyor or receptacle (not shown).

When the mandrel 274 strikes the closure member 138 and the vacuum is broken within the tubular member 10, the ball 276 falls from its position at the end of the mandrel and rolls along the inclination of the tubular member 10 into the depending portion 131. The weight of the ball 276 is sufficient to overcome the gravitational effect which maintains the disc 149 in closed position, and it falls into the inclined trough 150 and rolls to the opposite end thereof (not shown) adjacent the station of the first attendant.

It is apparent that the entire operation of separating the tub 275 and the mandrel 274, and the removal of both the tube and the mandrel from the apparatus is automatically completed in one continuous cycle of operation that results from the closing of a circuit through the normally open push button switch 272. At the end of this cycle, the various mechanisms of the apparatus are again in the normal position and other tubes may be cuffed upon the sleeve 17 to be removed from their mandrels by a repetition of this automatic cycle of operation of the apparatus.

In order that the apparatus may be adaptable for the separation of different sizes of tubes and mandrels, a plurality of sizes of the sleeves 17 may be provided. However, in order to accommodate very small sizes of tubes in a large tubular member 10, it may be desirable to employ an auxiliary tubular member 281 which may be removably secured within the tubular member 10. The auxiliary tubular member 281 is adapted to be positioned in the lower portion of the tubular member 10 and has an opening 282 which corresponds to the opening 38.

A spacing member 283 is rigidly mounted upon the auxiliary tubular member 281 and is adapted, when placing the member in position, to engage slidably the upper portion of the tubular member 10. An opening 283, provided with a screen 284, is formed in the auxiliary tubular member 281 directly opposite the opening 124 in the tubular member 10. An eccentric sleeve 285 similar to the sleeve 17 is adapted to be removably secured against the flanged collar 15 and is provided with an annular recess 286 adapted to receive the end of the auxiliary tubular member 281. The reduced portion of the sleeve 285 comprises concentric sections 287 and 288 between which the annular chamber 25 is formed. Short tubes 289 arranged externally to the sleeve 281 provide communication between tapered seats 291 formed in the sleeve. The tapered seats 291 are adapted to receive the tapered plugs 249 projecting from the collar 15 and the annular chamber 25. The auxiliary tubular member 281 does not extend throughout the entire length of the tubular member 10 but only far enough to accommodate the length of the tube 275.

It will be apparent from the foregoing description that an apparatus constructed according to my invention is very advantageous in the art of manufacturing pneumatic tires because of its speed, efficiency, simplicity and convenience of operation, and that the device is readily adaptable to cooperate with other existing equipment. The apparatus is capable of doing work equivalent to the output of a number of workmen engaged in the operation of stripping tubes from mandrels by the previously known processes.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. An apparatus for supporting an elongate member having a vulcanizable article molded thereto, a hollow member provided with vacuum producing means, means for positively engaging the article against the hollow member, and means operatively associated with the hollow member and with the vacuum producing means for placing the latter into communication with the hollow member.

2. A tube stripping machine comprising a hollow member provided with a movable closure at one end, a second closure for the member, fluid operated means for actuating the second closure and means actuated in response to the displacement of the first mentioned closure for varying the fluid pressure within the first mentioned means.

3. A tube stripping machine comprising an apparatus for removing a tube from a mandrel and means for supplying an anti-friction material to the interior of the apparatus.

4. A tube stripping machine comprising a chambered member for removing a tube from a mandrel, an anti-friction material container provided with a conduit communicating with the interior of the member and means for regulating the temperature of the container.

5. A tube stripping machine comprising a tubular member for removing a tube from a mandrel and a conduit opening into the member provided with means for introducing a cloud of powdered soapstone thereinto.

6. The combination with an elongate hollow member provided with an external peripheral recess at one end thereof and a closure at the other end, of a vacuum producing means having a valve controlled connection communicating with the member, a conduit extending from the recess to the connection between the valve and the member, and means for actuating the valve.

7. The combination with an elongate hollow member provided with an external peripheral recess at one end and a closure at the other end thereof, of a vacuum producing means having a connection communicating with the member, a pneumatically controlled valve, a valve structure provided with ports, an air compressor having connections communicating with the ports, a conduit leading from one of the ports of the valve structure to the pneumatically controlled valve, a conduit leading from a second port of the valve structure to the recess and means for actuating the valve structure to register either of the conduits with the air compressor connections.

8. The combination with a chambered member having a recessed sleeve, an opening, and a closure for the opening, of a cylinder having a piston therein operatively associated with the closure, a vacuum pump having a connection to the chambered member provided with a spring closed valve, a second cylinder having a piston therein operatively connected to the valve, a movable valve member connected to the cylinders by a plurality of conduits, means for supplying fluid under pressure to the valve member, said valve member in one position connecting one end of the first mentioned cylinder and one end of the second mentioned cylinder to the means, and the opposite end of the first mentioned cylinder to the atmosphere, and in another position connecting the opposite end of the first mentioned cylinder to the means, and the other end of the first mentioned cylinder and the second cylinder to the recess.

9. The combination with a chambered member having a recessed sleeve and an opening, of a closure for the opening, a cylinder having a piston therein operatively associated with the closure, a vacuum pump having a connection to the chamber provided with a spring closed valve, a second cylinder having a piston therein operatively connected to the valve, a movable valve member for controlling a plurality of conduits, means for supplying fluid under pressure to the valve member, said valve member in one position connecting one end of the first mentioned cylinder and one end of the second named cylinder to the means, and the opposite end of the first mentioned cylinder to the atmosphere; and in another position providing communication between the opposite end of the first mentioned cylinder to the means, the first mentioned end of the first mentioned cylinder and the second cylinder to the recess, and a solenoid for actuating the valve member.

10. A tube stripping apparatus comprising a chambered rigid member provided with an opening therein for receiving an end of a mandrel having a tube superposed thereon, tube securing means adjacent the opening for supporting an end of the tube and means for moving the mandrel through the opening into the chambered member.

11. A tube stripping apparatus comprising a chambered rigid member, a sleeve provided with securing means for supporting an end of a tube superposed upon a mandrel, and means for projecting the mandrel through the sleeve into the chambered member.

12. A tube stripping apparatus comprising a chambered member, a sleeve for supporting an end of a tube superposed upon a mandrel, the sleeve and the tube having a predetermined fluid pressure therebetween, means for reducing the fluid pressure between the end of the tube and the sleeve, and means for moving the mandrel with respect to the chambered member.

13. A tube stripping machine comprising a chambered member for supporting an end of a tube superposed upon a mandrel, the end of the tube and the member having a predetermined fluid pressure therebetween, means for projecting the mandrel into the member, and means for changing the normal fluid pressure between the sleeve and the end of the tube.

14. A tube stripping machine comprising a chambered member, a sleeve communicating with the interior of the member for supporting an end of a tube superposed upon a mandrel, the end of the tube and the mandrel having a predetermined fluid pressure therebetween, means for projecting the mandrel through the sleeve and into the member, and means for increasing the fluid pressure between the end of the tube and the sleeve.

15. A tube stripping machine comprising a chambered member, a sleeve communicating with the interior of the member for supporting an end of a tube superposed upon a mandrel, a surface of the sleeve having a fluid containing depression formed therein, means for varying the fluid pressure within the depression and means for projecting the mandrel through the sleeve.

16. A tube stripping apparatus comprising a chambered member provided with a plurality of openings, a sleeve communicating with the interior of the member for supporting an end of a tube superposed upon a mandrel, means for projecting the mandrel through the sleeve, the chamber and one of the openings, and a closure for another of the openings for discharging the tube from within the chambered member.

17. A tube stripping machine comprising a chambered member for supporting an end of a tube superposed upon a mandrel, a movable closure associated with an opening communicating with the interior of the member, means for projecting the mandrel against the closure, and means for changing the atmospheric pressure between the member and the end of the tube when the closure is displaced.

18. A tube stripping machine comprising a sleeve for supporting an end of a tube superposed upon a mandrel, a chambered member communicating with the sleeve and means for varying the atmospheric pressure between the tube and the sleeve, and within the member, simultaneously.

19. A tube stripping machine comprising a sleeve for supporting an end of a tube superposed upon a mandrel, a chambered member communicating with the sleeve, a movable closure associated with an opening formed in the chambered member, means for disposing the closure within the opening and means for projecting the mandrel through the sleeve.

20. A tube stripping machine comprising a chambered member for supporting an end of a tube superposed upon a mandrel, a closure operatively associated with an opening communicating with the interior of the member, and means for disposing the closure within the opening for changing the atmospheric pressure within the member, and for changing the atmospheric pressure between the end of the tube and the sleeve, simultaneously.

21. A tube stripping machine comprising means for supporting an end of a tube superposed upon a mandrel, a chambered member communicating with the means, means for projecting the mandrel through the member and means for removing the tube from within the member.

22. A tube stripping machine comprising means for supporting an end of a tube superposed upon a mandrel, a chambered member communicating with the means, the member having an opening communicating with the interior thereof, means for projecting the mandrel through the member and means for discharging a blast of fluid from within the member toward the opening.

23. A tube stripping machine comprising means for supporting an end of a tube superposed upon a mandrel, a chambered member communicating with the means, the member having an opening communicating with the interior thereof, means for projecting the mandrel through the member, means for discharging a blast of fluid from within the member through the opening and means adjacent the opening for transporting the tube therebeyond.

24. A tube stripping machine comprising means for supporting an end of a tube superposed upon a mandrel, a chambered member associated with the means, means for projecting the mandrel into the member and means for discharging a blast of fluid within the member for removing the tube therefrom.

25. A tube stripping machine comprising a sleeve for supporting an end of a tube superposed upon a mandrel, a chambered member associated with the sleeve, said chambered member having an opening formed therein, a closure for the opening, a piston operatively arranged within a cylinder for operating the closure, means for supplying compressed fluid alternately to opposite ends of the cylinder and means for discharging the fluid confined within one end of the cylinder between the end of the tube and the sleeve while fluid is being supplied to the opposite end thereof.

26. A tube stripping machine comprising means for supporting an end of a tube superposed upon a mandrel, a chambered member communicating with the means, a closure operatively associated with an opening formed in the member, means for projecting the mandrel through the member and against the closure, and means for rendering the last mentioned means inoperative when the closure is displaced.

27. A tube stripping machine comprising means for supporting an end of a tube superposed upon a mandrel, a chambered member, associated with the means, having a pair of openings formed therein, a pair of closures for the openings, means for projecting the mandrel through the member and against one of the closures, and means actuated in response to the displacement of the last mentioned closure, for displacing the remaining closure.

28. A tube stripping machine comprising means for supporting an end of a tube superposed upon a mandrel, a chambered member operatively associated with the means, means for projecting the mandrel into the member, a closure operatively associated with an opening formed in the member, means for discharging a blast of compressed fluid within the member and means for actuating the last mentioned means when the closure is displaced from the opening.

29. A tube stripping machine comprising means for supporting an end of a tube superposed upon a mandrel, means for separating the mandrel and the tube, and means for disengaging the tube from the first mentioned means, subsequently with respect to the separation of the tube and mandrel.

30. A tube stripping machine comprising means for supporting an end of a tube superposed upon a mandrel, means for securing the tube to the first mentioned means, means for separating the tube and the mandrel, and means controlled by the operation of the last mentioned means for rendering the second mentioned means inoperative.

31. A tube stripping machine comprising a chambered member for supporting an end of a tube superposed upon a mandrel, means for exhausting the fluid from within the chamber and a conduit communicating with the interior of the member, said conduit having its opposite end submerged in a quantity of anti-friction material.

In witness whereof, I have hereunto signed my name.

Signed at Akron, in the county of Summit and State of Ohio, this 12th day of April, 1927.

HERMAN T. KRAFT.